United States Patent
Guidry

[19]

[11] Patent Number: 6,119,585
[45] Date of Patent: Sep. 19, 2000

[54] APPARATUS FOR ROASTING AND GRILLING OF FOODSTUFFS

[76] Inventor: Ray A. Guidry, 1040 Anse Broussard Rd., Breaux Bridge, La. 70517

[21] Appl. No.: 09/061,548

[22] Filed: Apr. 16, 1998

[51] Int. Cl.[7] .............................. A47J 37/00; A47J 37/04; A47J 43/18

[52] U.S. Cl. ................................ 99/345; 99/347; 99/415; 99/417; 99/418; 99/419; 99/426; 99/446; 99/448

[58] Field of Search ........................ 99/426, 419–421 V, 99/446, 444, 425, 410, 400, 449, 448, 450, 401, 345–347, 415–418; 211/181.1; 426/509, 523

[56] References Cited

U.S. PATENT DOCUMENTS

| | | | |
|---|---|---|---|
| 4,557,188 | 12/1985 | Spanek | 99/415 |
| 4,633,773 | 1/1987 | Jay | 99/426 |
| 4,709,626 | 12/1987 | Hamlyn | 99/345 X |
| 5,069,117 | 12/1991 | Schlessel | 99/419 |
| 5,081,916 | 1/1992 | Kuhling et al. | 99/419 |
| 5,106,642 | 4/1992 | Ciofalo | 426/509 |
| 5,301,602 | 4/1994 | Ryczek | 99/345 |
| 5,501,142 | 3/1996 | Bailey | 99/345 X |
| 5,538,050 | 7/1996 | Galdon | 99/426 X |
| 5,662,028 | 9/1997 | Fraga | 99/419 |
| 5,791,235 | 8/1998 | Anselmo | 99/426 |
| 5,842,409 | 12/1998 | Loffler | 99/426 X |

*Primary Examiner*—Timothy Simone
*Attorney, Agent, or Firm*—Jesse D. Lambert; Greg R. Mier

[57] ABSTRACT

Cooking apparatus especially suited for grilling whole chickens and the like on a charcoal or gas fired grill, while maintaining the meat moist and permitting desirable flavorings to be imparted to the meat. The apparatus comprises at least one cylinder having a bore and first and second ends, attached to a base plate so that the cylinder is disposed substantially vertically when the base plate is placed on a horizontal surface, such as the grilling surface of a barbecue grill. The first end of the cylinder is sealably attached to the base plate. The second end of the cylinder is open, forming a container defined by the cylinder bore and the base plate. The apparatus is preferably of thermally conductive material such as aluminum. In use, the container is at least partially filled with a flavored liquid. A whole chicken is impaled on the cylinder, and the apparatus holding the chicken is then placed on the grilling surface of a barbecue grill. During cooking, the flavored liquid evaporates, flavoring and moistening the meat. Heat is conducted into the interior of the chicken for even cooking. Drippings from the chicken drip onto the base plate and then onto the charcoal, creating flavored smoke which then flows over the chicken, while the base plate partially shields the chicken from direct heat and flames to control searing and burning.

12 Claims, 7 Drawing Sheets

APPARATUS FOR ROASTING AND GRILLING OF FOODSTUFFS

BACKGROUND

1. Field of the Invention

The subject invention relates generally to an apparatus and method for cooking certain foodstuffs, especially whole chickens, ducks, pheasant and other fowl. More particularly, but without restriction, this invention relates to a unique cooking apparatus, and a method for using the apparatus, which permits roasting and grilling of whole chickens and other fowl while keeping the cooked meat moist and seasoned by vapors from a desired flavored liquid and by smoke generated by drippings.

2. Description of Related Art

Over recent years, the adverse health effects of foods containing high fat and cholesterol concentrations have caused concern among consumers. As a result, consumption of leaner type foods, in particular chicken and other poultry, has increased. Consumers have searched for improved methods to prepare these type foods so as to maintain exceptional flavor, while at the same time minimize the amount of fat and cholesterol added to the foods during the cooking process. For instance, instead of frying foods in oil or grease, more consumers are now broiling, grilling, steaming, baking, or roasting foods because these preparation methods generally reduce or eliminate the amount of fat and/or cholesterol added to the food during its preparation.

Of the favored food preparation methods mentioned above, one popular type of cooking is commonly referred to as "barbecuing." Barbecuing is popular because of the unique and desirable "outdoor taste" achieved from cooking on a barbeque grill. Barbecuing is also popular because it allows consumers to impart their own unique flavor to the barbecued food with special flavoring liquids or sauces.

Generally, barbecue grills include an oven-like housing which contains a food support or grilling surface. The grilling surface may comprise spaced-apart bars which can be parallel or crisscrossed. A heat source, which may be burning charcoal, or a gas flame combined with artificial "briquettes", radiates heat from beneath the grilling surface directly to the food lying thereon. As the radiated heat cooks the food, grease and other drippings from the food fall through the open grilling surface onto the charcoal or the artificial briquettes, thereby causing flames and smoke which enhance the flavor of the food.

Contrary to popular belief, the "outdoor taste" associated with barbecuing is not solely the result of cooking over charcoal or over a gas flame combined with artificial briquettes, but actually stems from the flavored smoke created when grease and other drippings from the food drip onto and ignite on the charcoal or briquettes. The flavored smoke created by the ignited grease and drippings permeates the food and imparts the popular "outdoor taste."

One problem associated with barbecuing is that the direct heat, which is not easily controlled, and the flames, which are generated when the grease and drippings ignite on the charcoal or briquettes, may tend to overcook, dry out, and even sear or burn at least the outer surface of the cooked food. This disadvantage is especially present when cooking whole fowl, such as chickens and the like. Chickens and other fowl are irregularly shaped and have a non-uniform distribution of fat under the skin, with a greater concentration of fat under the skin in the thigh and back area. As such, whole chickens and the like are difficult to cook on a barbecue grill because they must be constantly observed and manually turned at frequent intervals to prevent burning and drying out and to ensure even cooking of the entire chicken.

Some cooks attempt to prevent burning and drying out by basting the food with a flavored liquid or sauce before and during cooking. However, basting is inconvenient and troublesome because it requires regular attention at frequent intervals. The prior art addresses this problem with several devices that automatically baste food cooked on a grill, but these devices are complicated and expensive. Moreover, basting does not eliminate the burning and searing caused when grease and other drippings ignite into flames as they strike the heated charcoal or briquettes.

Ideally, then, it is desired to have a cooking apparatus which provides a means for:

keeping the grilled food moistened during cooking;

imparting desired tastes to the grilled food through vaporizing flavored liquids, with the vapors flowing over grilled food;

imparting desired tastes to the grilled food by permitting grease and other drippings to drip onto the charcoal or other heat source and thereby generating smoke, and maintaining the food in the path of the smoke;

conducting heat to the interior part of the food being cooked for uniformity and thoroughness in cooking; while at least partly shielding the food being grilled from direct heat and flames, to control searing and/or burning of the outer surface.

Other prior art apparatus have been directed toward some of the problems of drying out, burning, and searing associated with barbecuing. U.S. Pat. No. 5,501,142 to Builey discloses a steamer device that is filled with a flavored liquid and nested inside the bed of charcoal or briquettes. As the steamer device receives heat from the heat source, the flavored liquid is vaporized and released through a series of openings directed toward the grilling surface. The steam surrounds and permeates the food being cooked thereby imparting the flavor from the liquid to the grilled food while simultaneously moistening the food to prevent it from drying out. While the steamer disclosed in Builey may continuously flavor and moisten the food during the cooking process, it does not shield the food being grilled from direct heat and flames so as to control the burning and searing caused by flames created when grease and drippings from the cooked food ignite on the charcoal or briquettes. As a result, the steamer device of Builey does not eliminate the need to constantly observe and manually turn the food products at frequent intervals to prevent burning and to ensure even cooking of the entire mass.

U.S. Pat. No. 4,612,851 to McManus discloses a cooking utensil designed to solve the problem of burning, searing, or scorching the external surfaces of the food being cooked on a grill. However, unlike the device disclosed in Builey, the disclosed cooking utensil referred to in McManus does not provide a means for flavoring and moistening the food items during the cooking process.

The prior art shows no apparatus and method, particularly adapted to cooking whole chickens and other fowl on a barbecue grill or the like, which:

provides a means for imparting desired flavors through the steaming of flavored liquids in proximity to the fowl;

provides a means for conducting heat to the interior of the fowl being cooked to achieve even cooking throughout;

provides a means for at least partially shielding the cooking fowl from the direct heat source so as to control searing, burning and like effects; while permitting fat and other liquids cooked out of the fowl during the cooking process to drip onto the heat source and thence vaporize, and maintaining the cooking fowl in the path of the flavored smoke, vapors and the like produced by the dripped fat and other liquids.

Therefore, there is a need for an inexpensive, simple and effective device that enables the consumer to evenly cook whole chickens and the like on a barbecue pit, indoor oven, or gas grill without having to constantly attend to the food during the cooking process, and which enables the consumer to maintain the popular "outdoor taste" and any unique flavors that may be desired from a favorite liquid or sauce, while keeping the cooked food moist and controlling burning, searing, and/or drying.

SUMMARY OF THE INVENTION

An object of the present invention is to provide cooking apparatus and method particularly adapted to the cooking of whole chickens and the like in an indoor oven or over a charcoal, gas fired or open fire grill. Another object is to provide cooking apparatus and method that allows the consumer to impart the popular "outdoor taste" or any other desired flavor to the cooked food, and further allows the consumer to fully cook the food items while controlling burning, searing, and/or scorching the external surfaces of the food items.

A further objective of the present invention is to provide a cooking utensil that permits cooking whole fowl and the like while minimizing the grill area needed, thereby allowing the simultaneous preparation of other food items on the grill.

Another object of the present invention is to eliminate the necessity of constantly manipulating the food during the cooking process to insure that all portions of the food are evenly exposed to the heat source.

In the preferred embodiment, the apparatus of the present invention includes a base plate for generally horizontal placement on a grilling surface of a barbecue grill, the base plate having at least one elongated, hollow cylinder affixed to it and projecting generally vertically upward from the base plate. The elongated cylinder is attached to the base plate, with an open end distal from the base plate, thereby forming a liquid-tight container. The base plate and cylinder are preferably of a heat-resistant, thermally-conductive material, such as aluminum, stainless steel or the like.

Each cylinder has a diameter adapted for insertion into the body cavity of a whole chicken or other fowl. The length of each cylinder is sufficient to support a whole chicken or other like fowl in an upright position by inserting the length of the cylinder inside the cavity of the chicken or other fowl. The length of the container must be sufficiently short, however, to enable use of the present invention with a standard sized barbecue pit, indoor oven, or gas grill. The container formed by the mounting of the cylinder on the base plate has sufficient volume to permit an adequate amount of flavored liquid to be placed therein.

The shape and dimensions of the base plate are adapted to serve several functions:

provide sufficient support for the mounted chickens to prevent toppling of the impaled chickens while being cooked;

at least partially shield the impaled chicken or other fowl from flames caused by grease and other drippings that strike the hot charcoals or briquettes when the device is used in conjunction with a barbecue pit or gas grill;

permit grease and other drippings from the cooked food to drip onto the charcoal or briquettes during the cooking process to create flavored smoke; and maintain the meat being cooked in the path of the produced smoke.

The base plate may have openings, such as small slots or holes, to allow the grease and other drippings to seep through onto the hot charcoal or briquettes, while still largely shielding the cooking meat from any direct flames.

The device of the present invention is easy to operate with any conventional indoor oven or charcoal, gas fired, or open fire grill. Each container may be at least partially filled with a flavored liquid which may be wine, beer, or any number of seasoned or flavored liquids. Once the flavored liquid is placed within the containers, the chicken or other meat being cooked is impaled on the cylinder, and the device is placed on the oven or grilling surface so that heat is transferred to the device and the liquid contained therein. As the heat vaporizes the liquid inside the cylinder, the flavor from the liquid is imparted to the grilled food. The flavored vapor also moistens the food to prevent drying out.

As the chicken or other fowl cooks, drippings and juices fall from the cooked food and either evaporate on the base support plate or drip onto the hot charcoal or briquettes below where they ignite into flames and smoke which further flavors the food. The base support plate prevents the flames caused by the grease and other drippings from directly contacting the cooked food, thereby preventing burning, searing, and/or scorching of the food.

Further features and advantages of the invention will be apparent from the description below.

DESCRIPTION OF THE PREFERRED EMBODIMENT

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof) falling within the scope of the appended claims.

In particular, while various embodiments of the present invention will be described in conjunction with use of the apparatus to grill whole chickens on a barbecue grill, it is understood that the invention is not so limited. Other types of foodstuffs, including whole fowls such as ducks, may be cooked with the apparatus;

and the apparatus may be employed in conventional indoor ovens as well as outdoor barbecue grills.

Figure 1:
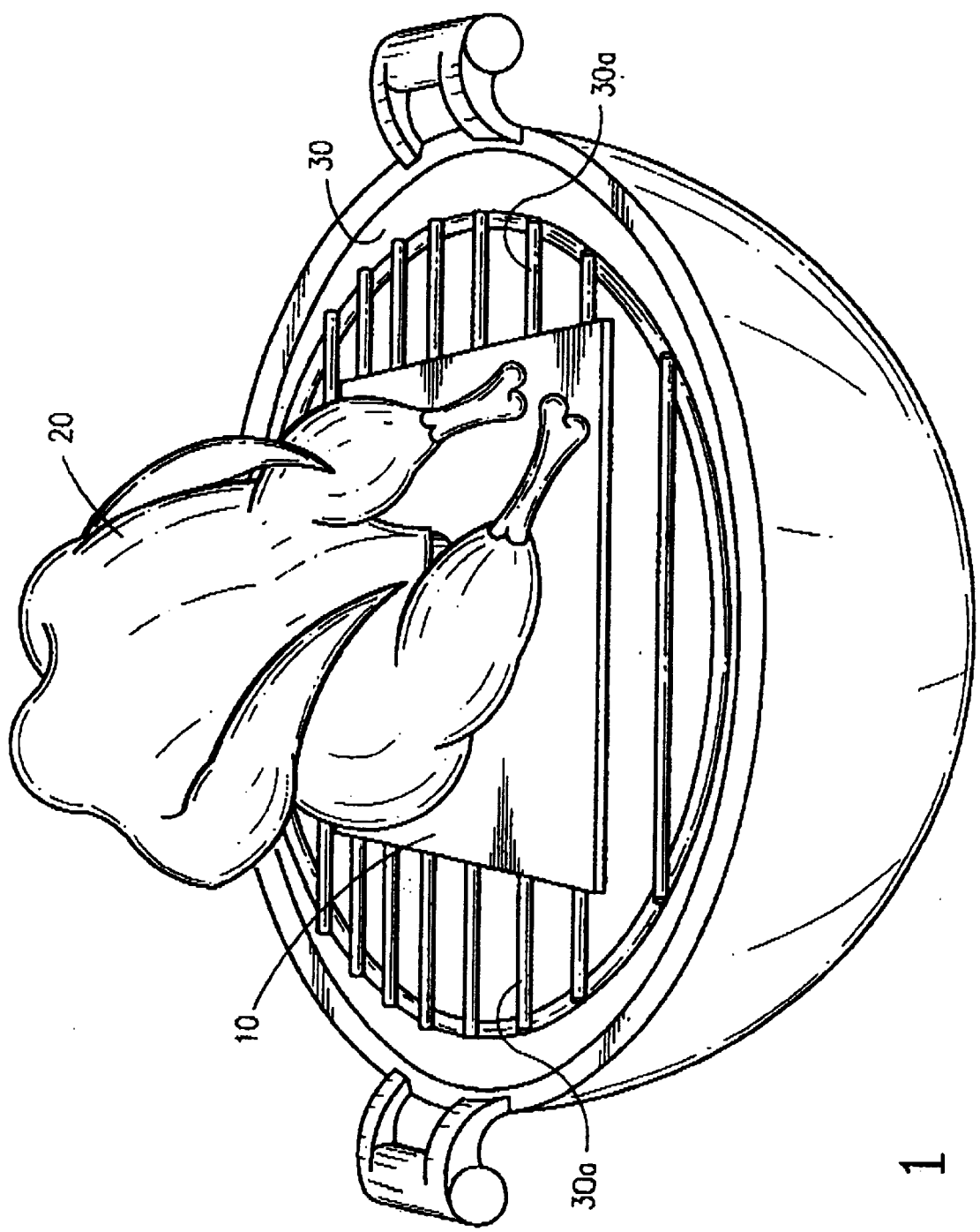
FIG. 1 shows the cooking apparatus of the present invention with a whole chicken impaled thereon, in conjunction with a barbecue grill.
Figure 2:
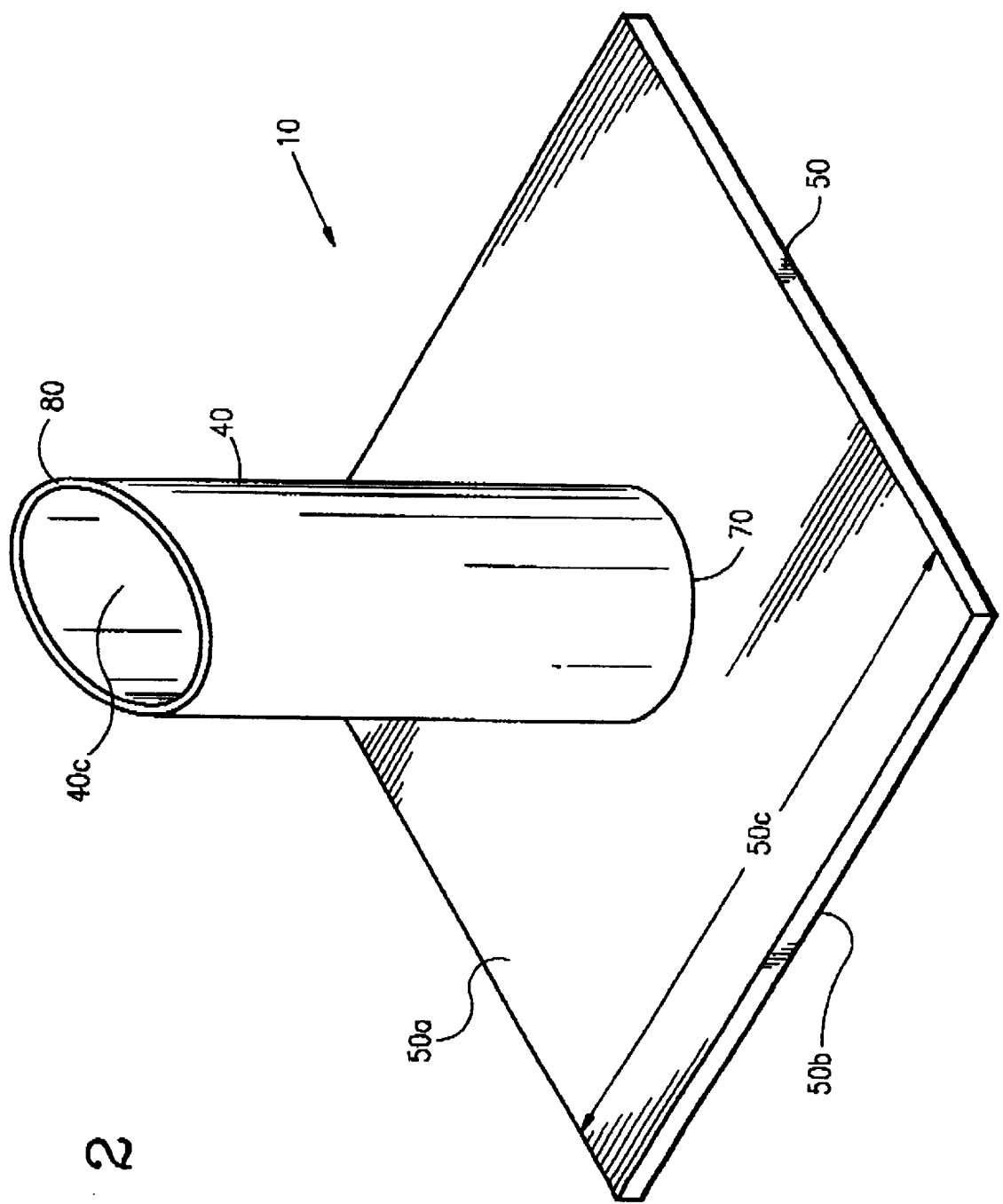
FIG. 2 is a perspective view of the cooking apparatus.

Referring now to FIG. 1, the cooking apparatus 10 according to the present invention is shown as it is used in conjunction with a barbecue grill 30 to cook a whole chicken 20. Cooking apparatus 10 is simple to use and functions continuously during the cooking process without any further operation or adjustment. Cooking apparatus 10 does not interfere with the operation of the barbecue pit, oven, or grill. When cooking is complete, cooking apparatus 10 may be easily removed for cleaning and is durable to be used and re-used time and again.

Now referring to FIGS. 2 through 5, cooking apparatus 10 includes a cylinder 40 and a base plate 50. In the preferred embodiment, base plate 50 is a flat, square plate with a top face 50a, a bottom face 50b, and side dimension 50c. Although base plate 50 is illustrated as square, base can also be circular, rectangular, or any other flat, geometric shape.

Figure 3:
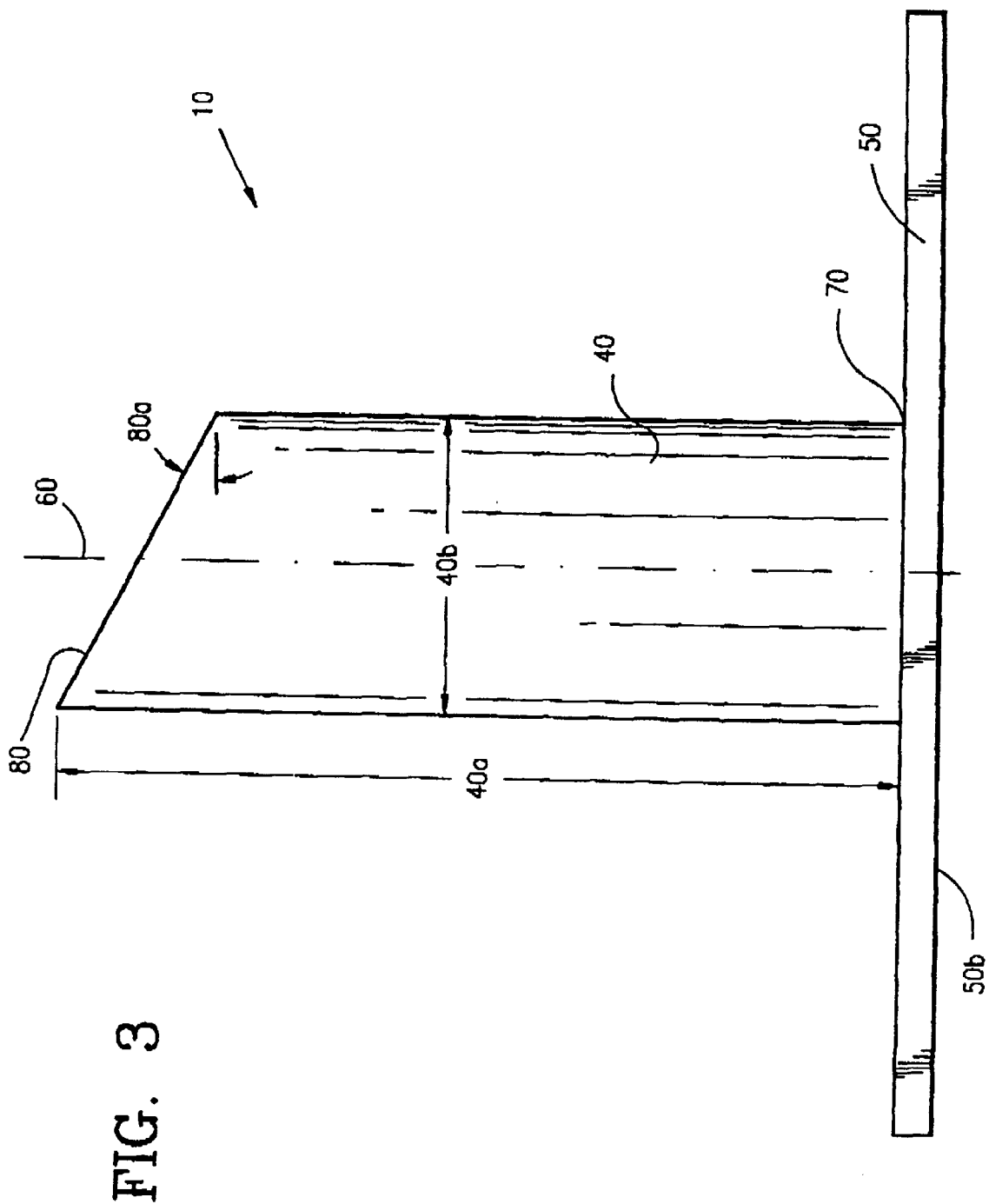
FIG. 3 is a side view of the cooking apparatus.
Figure 4:
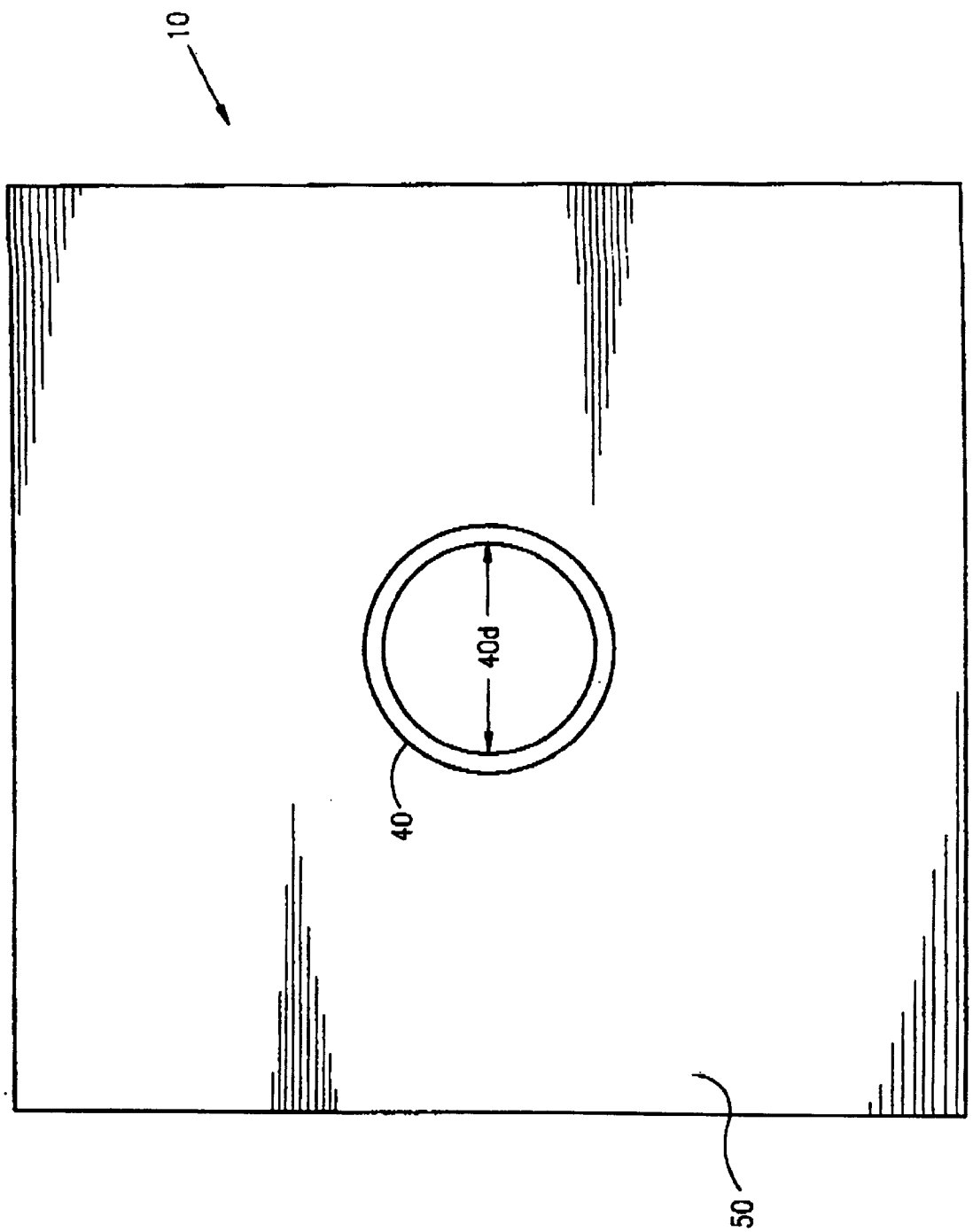
FIG. 4 is a top view of the cooking apparatus.

Cylinder 40 is preferably hollow with a length 40a, an outer diameter 40b, a bore 40c, a longitudinal axis 60, a first end 70 and an open, second end 80. Second end 80 can be cut perpendicular to longitudinal axis 60 or cut at an angle 80a, as shown in FIG. 3, for ease in inserting cylinder 40 into a whole chicken as described more fully below. The value of angle 80a may be any one range of values, although a suitable value is approximately 30 degrees.

Although cooking apparatus 10 may be constructed by various means well known in the art, in one embodiment cooking apparatus 10 is constructed by sealably attaching first end 70 of cylinder 40 to top face 50a of base plate 50 so that longitudinal axis 60 of cylinder 40 is substantially vertical when base plate 50 is placed on a substantially horizontal surface, such as a grilling surface. Although different materials may be used to construct cooking apparatus 10, cooking apparatus 10 is preferably of a rigid, thermally-conductive material such as aluminum or stainless steel. The preferred method for sealably attaching first end 70 of cylinder 40 to top face 50a of base plate 50 is by welding, especially when cooking apparatus 10 is constructed with aluminum or stainless steel. However, it is understood that other means of attaching cylinder 40 to base plate 50 well known in the art, such as threadably attached, may also be used.

Base plate 50 supports cylinder 40 in a substantially vertical position when base plate 50 is placed on a cooking surface, and at least partially shields the food being cooked from direct heat and flames in an oven, barbecue pit, or gas grill. Therefore, base plate 50 should be shaped so as to prevent cooking apparatus 10 from toppling over when cylinder 40 is filled with liquid and cooking apparatus 10 is supporting a whole chicken or other fowl impaled on cylinder 40. Base plate 50 should also be sized and shaped so as to block any flames arising from below cooking apparatus 10 that may come into direct contact with the food impaled on cylinder 40. However, the size and shape of base plate 50 should allow grease and other drippings from the cooked food to reach the hot charcoal or briquettes located below the grilling surface to create flavored smoke, which will rise and permeate the cooked food with the popular "outdoor taste" which is derived from the smoke. Field tests have indicated that a square base plate 50 with side dimension 50c of approximately seven inches, with or without small openings therethrough (as will be described below), satisfactorily serves the aforementioned purposes of base plate 50.

Height 40a of cylinder 40 should be sufficient to support a whole chicken or the like, which is cleaned and dressed for cooking, in an upright position when cylinder 40 is inserted into the cavity of a whole chicken or other fowl, as shown in FIG. 1. However, height 40a of cylinder 40 should not be so great as to prevent use of cooking apparatus 10 inside a conventional oven or barbecue grill. Based on experimentation with standard sized chickens and the like, which weigh in the range of 3½ to 4 pounds, height 40a is preferably four to five inches.

Outer diameter 40b of cylinder 40 should be sufficient to occupy a significant portion of the body cavity of a chicken or other fowl, yet small enough to readily enter the body cavity. Based on tests conducted with standard sized chickens and the like, which weigh approximately 3½ to 4 pounds, a suitable outer diameter 40b is approximately two and one-half inches. Cylinder 40 may be constructed of material having a wall thickness of about ⅛ inch, creating an inner diameter 40d of approximately 2¼ inches. Such a bore size allows cylinder 40 to hold an adequate amount of flavored liquid or sauce to thoroughly flavor and moisten the cooked meat as the liquid or sauce is vaporized during the cooking process.

To use cooking apparatus 10, a flavored liquid or sauce is poured into the bore of cylinder 40 through the open second end 80. Preferably, container 12 is filled to within approximately one-half inch of the second end 80. The flavored liquid or sauce can be beer, wine, pineapple juice, or any one of several of a variety of seasoned or flavored liquids and sauces.

Once the bore of cylinder 40 is filled with the desired liquid or sauce, cylinder 40 is inserted into the internal cavity of a whole chicken or other like fowl, which has been cleaned and dressed for cooking, so that the chicken or other fowl is standing in a substantially upright position, as shown in FIG. 1. Angled second end 80 of cylinder 40, in the preferred embodiment, is specially adapted for impaling and supporting whole chickens and like fowl in the upright position.

Once the whole chicken or like fowl is firmly supported and standing upright on cylinder 40, cooking apparatus 10 can be either placed in a catch pan inside an oven, or on the grilling surface of a barbecue grill (as shown in FIG. 1) containing lit charcoal, or a gas fired grill containing hot briquettes.

As the food cooks, cooking apparatus 10 is continually heated, thereby causing the flavored liquid or sauce to evaporate and permeate the food to continually flavor and moisten the food and keep it from drying out. The flavoring and moistening process continues as long as there is flavored fluid within the bore of cylinder 40.

During the cooking process, heat is conducted through base plate 50 and cylinder 40 and transferred to inside the cavity of the impaled chicken or like fowl to insure that the entire chicken or like fowl is cooked evenly throughout its entire mass. This feature of the present invention helps alleviate the problem associated with having to frequently attend the cooked food on a regular basis to ensure that the food is cooked evenly on all sides and both externally and internally.

As the food cooks, grease and other drippings from the fat and skin of the chicken or like fowl drip downwardly onto top face 50a of base plate 50, and eventually fall into the catch pan (when using an oven) or through the grilling surface to contact the hot charcoal or briquettes (when using a barbecue grill or gas fired grill). When the drippings contact the heated charcoal or briquettes, they ignite to provide flames and smoke which circulates around the food being cooked to further flavor the food with the popular "outdoor taste." Accordingly, when used in conjunction with a barbecue pit or gas fired grill, the present invention promotes additional flavoring of the food while maintaining the desired "outdoor taste" which is achieved with the grilling process.

The present invention controls the burning, searing, and/or scorching caused by flames created when grease and other drippings ignite on the heated charcoal or briquettes. Base plate 50 is designed to shield the food impaled on cylinder 40 from any uncontrolled flames which may arise from below cooking apparatus 10. As may be appreciated, trying to prevent such flames from burning, searing, or scorching the food is both time consuming and undesirable and sometimes results in removing the food before it is completely cooked. The present invention eliminates the need to constantly turn the food or remove it from the grilling surface before it is completely cooked to prevent the outside of the food from burning, searing, and/or scorching. As a result, cooking on a barbecue pit or gas fired grill becomes a more pleasurable and worry-free experience using the present invention, and the food may be cooked to the desired state without fear of it being burned, seared, or scorched on the outside and undercooked on the inside.

After the food is cooked, it can be easily removed from cooking apparatus 10, which can be easily cleaned by removing it from the grill and flushing it out with water.

Figure 5A:
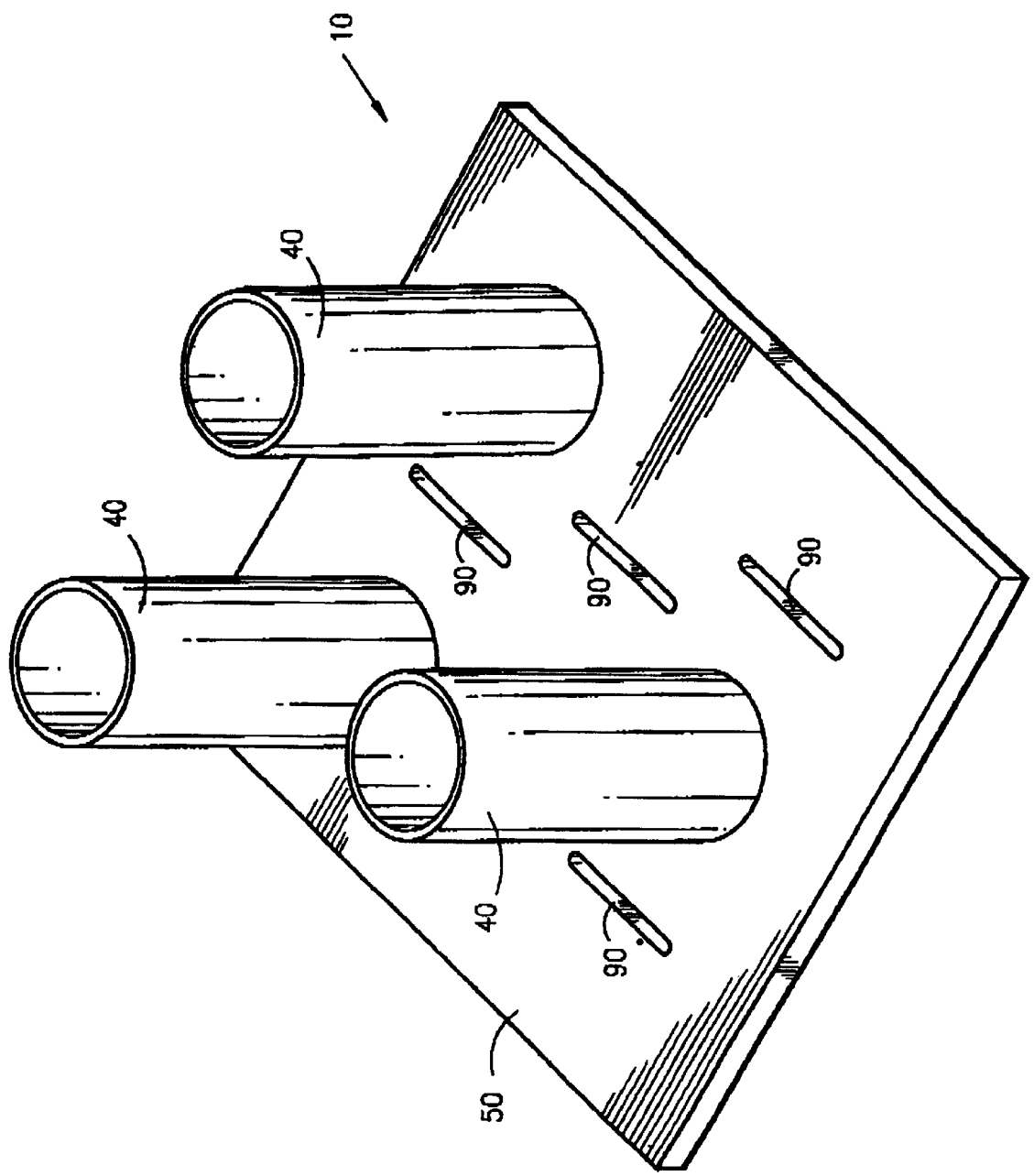
FIG. 5A is a perspective view of another embodiment of the cooking apparatus.
Figure 5B:
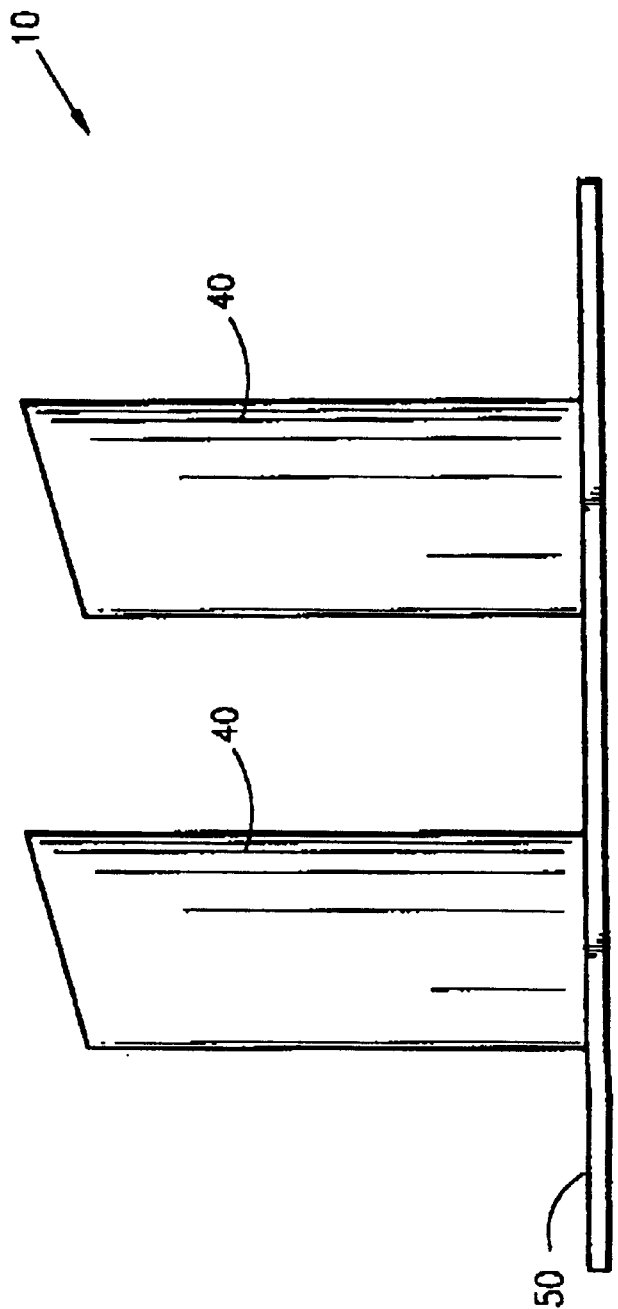
FIG. 5B is a side view of the embodiment shown in FIG. 5A.

Different embodiments of the present invention are contemplated. In an alternative embodiment, openings 90 may be provided in base plate 50, as shown in FIG. 5A, to readily allow grease and drippings from the cooked food to reach the hot charcoal and briquettes. Openings 90 would typically be relatively small to prevent any flames from reaching the food during the cooking process. Multiple cylinders 40 may be attached to a single base plate 50, as shown in FIGS. 5A and 5B, to permit cooking multiple chickens or other fowl.

Figure 7:
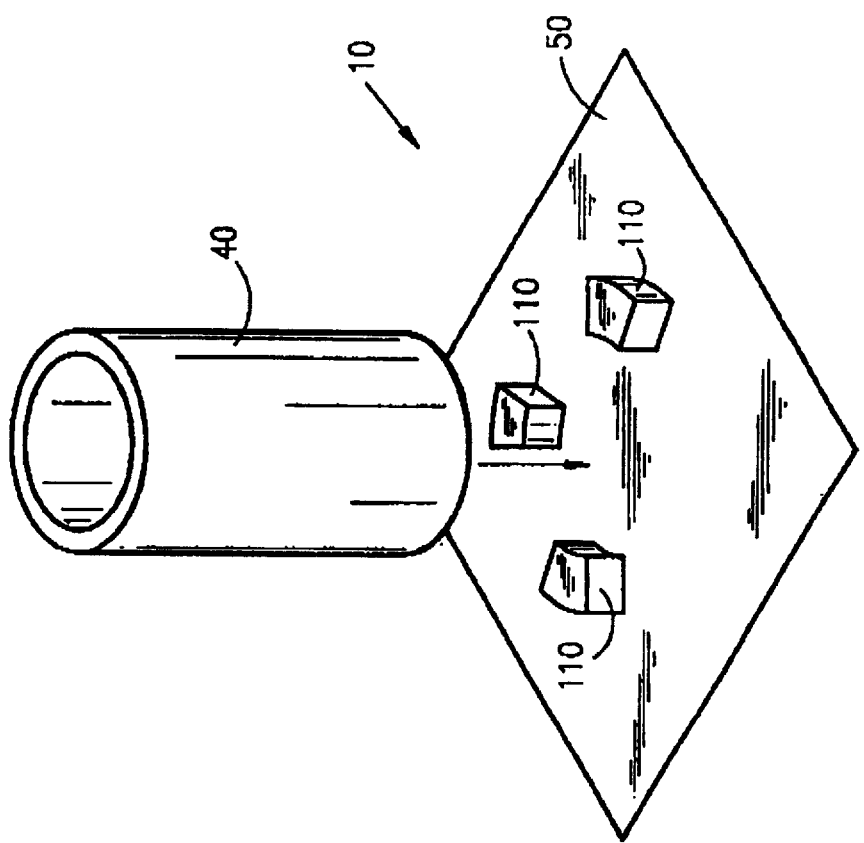
FIGS. 6 and 7 are perspective views of alternative embodiments of the present invention.
Figure 6:
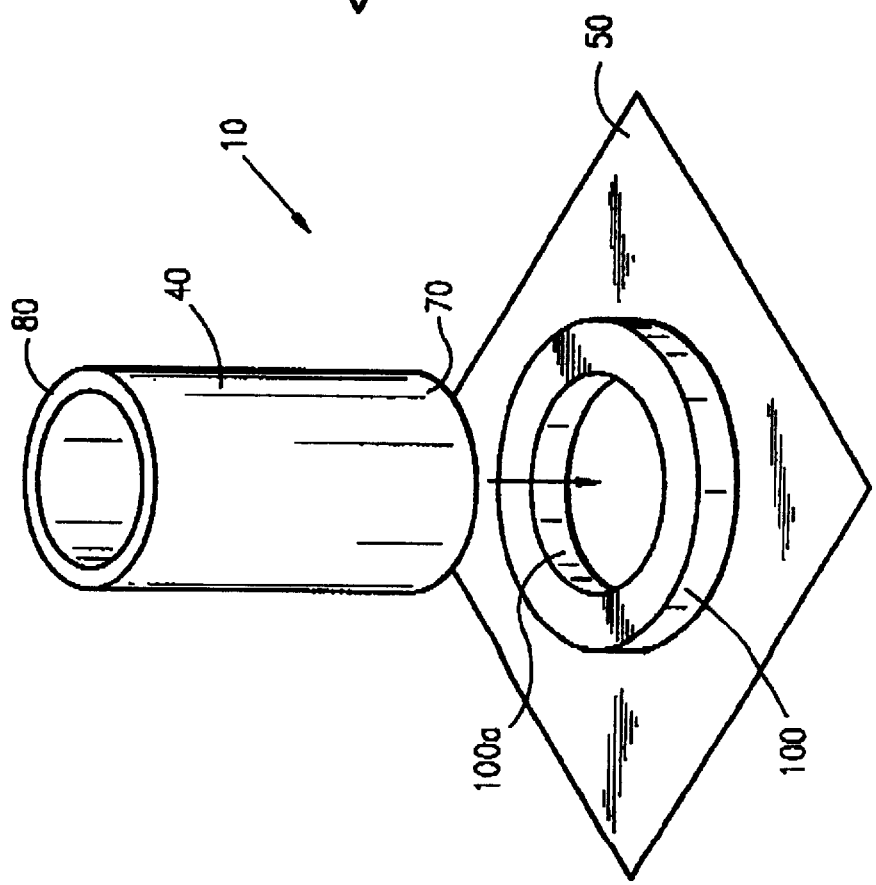

In yet another embodiment, shown in FIGS. 6 and 7, cylinder 40 is not permanently fixed to base plate 50; instead, means for removably mounting cylinder 40 to base plate 50 are provided. In one embodiment, cylinder 40 is removably mounted in a collar 100 which is fixed to base plate 50, as shown in FIG. 6. First end 70 of cylinder 40 is inserted into collar 100, collar 100 having a bore 100*a* with a diameter which is sized to form a sufficiently tight fit to maintain cylinder 40 in a substantially upright position. In such embodiment, cylinder 40 may be provided with a closed first end 70 to form a container. Yet another embodiment employs a plurality of lugs 110 on base plate 50 to permit removable mounting of cylinder 40 on base plate 50, as shown in FIG. 7. After use, cylinder 40 may be taken out of collar 100 for ease in cleaning and storage.

Still another embodiment of the invention provides cooking apparatus 10 in combination with a heat source, as shown in FIG. 1, which may comprise a barbecue grill 30 having a grilling surface 30*a*.

Although the description above contains many specificities, these should not be construed as limiting the scope of the invention but as merely providing illustrations of some of the presently preferred embodiments. For example, the base may be of various shapes and sizes; multiple cylinders may be attached to the base to permit multiple chickens or other fowl to be cooked; the base may have a variety of number, size and shape of openings to permit drip-through of liquids onto the heat source; the apparatus may be used in different barbecue grills or indoor ovens; the cylinder may be removably fixed to the base for storage, cleaning, etc.

Thus the scope of the invention should be determined by the appended claims and their legal equivalents, rather than by the examples given.

What is claimed is:

1. A cooking apparatus, comprising:
    a) a base plate constructed of thermally conductive material;
    b) at least one cylinder constructed of thermally conductive material, said at least one cylinder having a length, an outer diameter, a bore with a diameter, a first end, and a second end, said first end of said at least one cylinder sealingly affixed to said base plate with said at least one cylinder extending substantially perpendicular to said base plate, said second end of said at least one cylinder being cut at an angle to a longitudinal axis of said at least one cylinder, said length of said at least one cylinder being between about 3 and 6 inches, said outer diameter of said at least one cylinder being between about 2 and 3 inches, said base plate being square and having a side dimension of between about 6 and 7 inches, said bore of said at least one cylinder forming a container, and said outer diameter of said at least one cylinder adapted to be inserted into the body cavity of a whole fowl.

2. The apparatus of claim 1, wherein said at least one cylinder comprises at least two cylinders.

3. The apparatus of claim 1, wherein said apparatus is of stainless steel.

4. The apparatus of claim 1, wherein said apparatus is of aluminum alloy.

5. The apparatus of claim 2, wherein said apparatus is of stainless steel.

6. The apparatus of claim 2, wherein said apparatus is of aluminum alloy.

7. An apparatus for cooking whole fowl while maintaining said whole fowl moist and flavorful, comprising:
    a) a grilling surface;
    b) a heat source disposed below said grilling surface and adapted to radiate heat upward toward said grilling surface;
    c) a base plate constructed of a thermally conductive material and at least one cylinder constructed of a thermally conductive material, said base plate being removably disposed on said grilling surface, said at least one cylinder having a length, an outer diameter, a bore with a diameter, a first end, and a second end, said first end of said at least one cylinder sealingly affixed to said base plate, said second end of said at least one cylinder being cut at an angle to a longitudinal axis of said at least one cylinder, said length of said at least one cylinder being between about 3 and 6 inches, said outer diameter of said at least one cylinder being between about 2 and 3 inches, said base plate being square and having a side dimension of between about 6 and 7 inches, said at least one cylinder extending substantially perpendicular to said base plate, said bore of said at least one cylinder forming a container, and said outer diameter of said at least one cylinder adapted to be inserted into the body cavity of a whole fowl.

8. The apparatus of claim 7, further comprising a plurality of openings in said base plate.

9. The apparatus of claim 7, wherein said apparatus is of stainless steel.

10. The apparatus of claim 7, wherein said apparatus is of aluminum alloy.

11. The apparatus of claim 8, wherein said apparatus is of stainless steel.

12. The apparatus of claim 8, wherein said apparatus is of aluminum alloy.

* * * * *